United States Patent
Grossman, IV et al.

(10) Patent No.: US 11,695,835 B2
(45) Date of Patent: *Jul. 4, 2023

(54) SYNCHRONIZATION OF APPLIANCES TO A SCHEDULE OF A USER

(71) Applicant: Google LLC, Mountain View, CA (US)

(72) Inventors: John Henry Grossman, IV, Santa Clara, CA (US); Scott Bartlett, Oakland, CA (US)

(73) Assignee: Google LLC, Mountain View, CA (US)

(*) Notice: Subject to any disclaimer, the term of this patent is extended or adjusted under 35 U.S.C. 154(b) by 8 days.

This patent is subject to a terminal disclaimer.

(21) Appl. No.: 17/306,938

(22) Filed: May 3, 2021

(65) Prior Publication Data

US 2021/0274000 A1 Sep. 2, 2021

Related U.S. Application Data

(60) Continuation of application No. 16/447,595, filed on Jun. 20, 2019, now Pat. No. 11,005,942, which is a
(Continued)

(51) Int. Cl.
*H04L 67/125* (2022.01)
*G05B 19/02* (2006.01)
(Continued)

(52) U.S. Cl.
CPC ............ *H04L 67/125* (2013.01); *G05B 15/02* (2013.01); *G05B 19/02* (2013.01);
(Continued)

(58) Field of Classification Search
CPC .... G05B 15/02; G05B 19/02; G05B 19/0426; G05B 19/05; G05B 2219/13063;
(Continued)

(56) References Cited

U.S. PATENT DOCUMENTS 5,333,299 A 7/1994 Koval
7,274,305 B1 9/2007 Luttrell
(Continued)

FOREIGN PATENT DOCUMENTS

DE 19802650 A1 7/1999
JP 2009017564 A * 1/2009
(Continued)

*Primary Examiner* — Crystal J Barnes-Bullock
(74) *Attorney, Agent, or Firm* — Kilpatrick Townsend & Stockton LLP

(57) ABSTRACT

A method and system are provided that synchronize one or more appliances to one or more users' schedules. Sensor data may be obtained from a sensor. The sensor data may indicate a state of a first appliance. A user location may be determined. A first characteristic of the first appliance may be obtained. Based upon the user location and the sensor data, a schedule indicating when the user will desire a state change of the first appliance may be determined. A feature of the first appliance may be dynamically modified to cause the first appliance to operate according to the schedule. A notice may be sent to the user that contains information about the first appliance.

27 Claims, 3 Drawing Sheets

Related U.S. Application Data division of application No. 15/400,724, filed on Jan. 6, 2017, now Pat. No. 10,362,118, which is a continuation of application No. 13/713,413, filed on Dec. 13, 2012, now Pat. No. 9,541,912.

(51) Int. Cl.
*H04L 67/306* (2022.01)
*G06F 1/3203* (2019.01)
*G05B 15/02* (2006.01)
*G05B 19/042* (2006.01)
*G05B 19/05* (2006.01)

(52) U.S. Cl.
CPC ......... *G05B 19/0426* (2013.01); *G05B 19/05* (2013.01); *G06F 1/3203* (2013.01); *H04L 67/306* (2013.01); *G05B 2219/13063* (2013.01); *G05B 2219/25387* (2013.01); *G05B 2219/2633* (2013.01); *G05B 2219/2642* (2013.01)

(58) Field of Classification Search
CPC .. G05B 2219/25387; G05B 2219/2633; G05B 2219/2642; G06F 1/3203; H04L 12/2803; H04L 12/2809; H04L 12/282; H04L 2012/285; H04L 67/125; H04L 67/306; H02J 3/14; H02J 2003/143; H02J 2003/146

See application file for complete search history.

(56) References Cited

U.S. PATENT DOCUMENTS

| | | | |
|---|---|---|---|
| 7,600,218 B2 | 10/2009 | Yamamoto | |
| 7,778,734 B2 * | 8/2010 | Oswald | G05B 15/02 700/277 |
| 8,285,693 B2 | 10/2012 | Mahajan | |
| 8,386,082 B2 * | 2/2013 | Oswald | G05B 15/02 455/457 |
| 8,475,367 B1 | 7/2013 | Yuen | |
| 8,600,562 B2 * | 12/2013 | Oswald | G05B 15/02 700/277 |
| 8,798,445 B2 * | 8/2014 | Marks | H04N 21/4314 386/297 |
| 9,154,001 B2 | 10/2015 | Dharwada | |
| 9,497,595 B2 | 11/2016 | Shin | |
| 9,541,912 B1 | 1/2017 | Grossman, IV | |
| 9,762,407 B2 * | 9/2017 | Matsuzaki | G06F 13/00 |
| 10,171,949 B2 * | 1/2019 | Moon | H04L 12/282 |
| 10,203,665 B2 * | 2/2019 | Lyman | H04L 12/2829 |
| 10,535,995 B2 * | 1/2020 | Kawata | G16H 50/20 |
| 10,616,713 B1 * | 4/2020 | Yu | H04W 64/006 |
| 11,368,328 B2 * | 6/2022 | Amano | F24F 11/30 |
| 2005/0108326 A1 | 5/2005 | Tuttle | |
| 2005/0171645 A1 | 8/2005 | Oswald | |
| 2006/0053075 A1 | 3/2006 | Roth | |
| 2007/0162957 A1 | 7/2007 | Bartels | |
| 2007/0248848 A1 | 10/2007 | Marsh | |
| 2009/0072997 A1 | 3/2009 | Shrum | |
| 2009/0150452 A1 | 6/2009 | Van | |
| 2010/0070054 A1 | 3/2010 | Solomon | |
| 2010/0082175 A1 | 4/2010 | Gartner | |
| 2010/0161149 A1 | 6/2010 | Nguyen | |
| 2011/0093099 A1 | 4/2011 | Tran | |
| 2011/0125329 A1 * | 5/2011 | Oswald | G05B 15/02 700/276 |
| 2011/0185302 A1 | 7/2011 | Kalapodas | |
| 2011/0211813 A1 * | 9/2011 | Marks | H04N 21/41407 715/764 |
| 2011/0303311 A1 | 12/2011 | Klicpera | |
| 2012/0004871 A1 | 1/2012 | Tsao | |
| 2012/0053871 A1 | 3/2012 | Sirard | |
| 2012/0065789 A1 | 3/2012 | Scelzi | |
| 2012/0065802 A1 | 3/2012 | Seeber | |
| 2012/0083934 A1 | 4/2012 | Jesudason | |
| 2012/0158203 A1 | 6/2012 | Feldstein | |
| 2012/0165990 A1 | 6/2012 | McCormack | |
| 2013/0110425 A1 | 5/2013 | Sharma | |
| 2013/0325997 A1 | 12/2013 | Higgins | |
| 2014/0297001 A1 | 10/2014 | Silverman | |
| 2015/0293511 A1 | 10/2015 | Laufer | |
| 2016/0359325 A1 | 12/2016 | Kawata | |
| 2017/0295469 A1 | 10/2017 | Moon | |

FOREIGN PATENT DOCUMENTS

| | | |
|---|---|---|
| JP | 2015133663 A * | 7/2015 |
| WO | 2010031017 A1 | 3/2010 |

\* cited by examiner

SYNCHRONIZATION OF APPLIANCES TO A SCHEDULE OF A USER

CROSS-REFERENCES TO RELATED APPLICATIONS

This application is a continuation of U.S. application Ser. No. 16/447,595, filed Jun. 20, 2019, which is a divisional of U.S. application Ser. No. 15/400,724, filed Jan. 6, 2017, which is a continuation of U.S. application Ser. No. 13/713,413, filed Dec. 13, 2012, the disclosures of which are hereby incorporated by reference in their entirety for all purposes.

BACKGROUND

Modern appliances may have some synchronization features incorporated into them. For example, a dryer typically requires substantially more time to dry clothes than a washer does to wash the same amount of clothes. Damp clothes left unattended after being washed in the washer may gain a foul odor. Some modern washer and dryer appliances may synchronize one of the appliances with the other. Appliances may be connected and communicate over a network.

A goal of many appliance management systems is to optimize energy usage based on, for example, patterns of consumption, time of day, and user presence. For example, HVAC systems may be adaptive in response to environmental conditions in order to decrease the amount of energy consumed. Such systems have been described both for commercial and residential applications. A user-centric appliance management system, that personalizes the actions of one or more appliances based on one or more users irrespective of or in addition to energy consumption may be desirable.

BRIEF SUMMARY

According to an implementation of the disclosed subject matter, sensor data may be obtained from a sensor. The sensor data may indicate a state of a first appliance. A user location may be determined. A first characteristic of the first appliance may be obtained. Based upon the user location and the sensor data, a schedule indicating when the user will desire a state change of the first appliance may be determined. A feature of the first appliance may be dynamically modified to cause the first appliance to operate according to the schedule. A notice may be sent to the user that contains information about the first appliance.

In an implementation, a system is provided that includes a central controller. The central controller may include a processor and computer readable storage. The processor may be configured to obtain sensor data from a sensor. The sensor data may indicate a state of a first appliance. The processor may obtain a characteristic of the first appliance. A user location may be determined. Based upon the user location and the sensor data, the processor may determine a schedule indicating when the user will desire a state change of the first appliance and dynamically modify a feature of the first appliance to cause the first appliance to operate according to the schedule.

Additional features, advantages, and implementations of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Many systems are known to optimize appliances for the purpose of reducing energy consumption or to save on costs incurred from energy consumption by appliances. For example, systems exist that synchronize a washer and a dryer to the same cycle and transmit a message to a user upon completion of both of the appliances. However, these systems do not consider the schedule of a user, and do not synchronize an appliance to the schedule of a user. In some instances, it may require more energy to synchronize the appliance to the user's schedule; thus known systems may avoid considering a particular user's schedule when adjusting behavior of an appliance to optimize energy usage.

According to an implementation, a technique for personalizing an action of an appliance is provided. For example, a washer may be synchronized to a dryer based on the schedule of the user and the synchronization of the appliances may require more energy to be consumed. Typically, a washer will finish before a dryer if both are begun at the same time. Under existing systems, if a user does not return to the house until well after the customary completion time for the washer and dryer, the washer and dryer will either cease activity upon completion of their respective cycles or tumble the clothes at a specified interval until the user unloads the clothes. As disclosed herein, it may be more desirable to have the washer and dryer cycles more tuned to the schedule of the user. In the current example, it may mean that the lengths of the washer and/or dryer cycles are increased to correspond to the next expected arrival of the user. Thus, the appliance is made responsive to a user's schedule and its behavior may be dynamically adjusted based on it.

Figure 1:
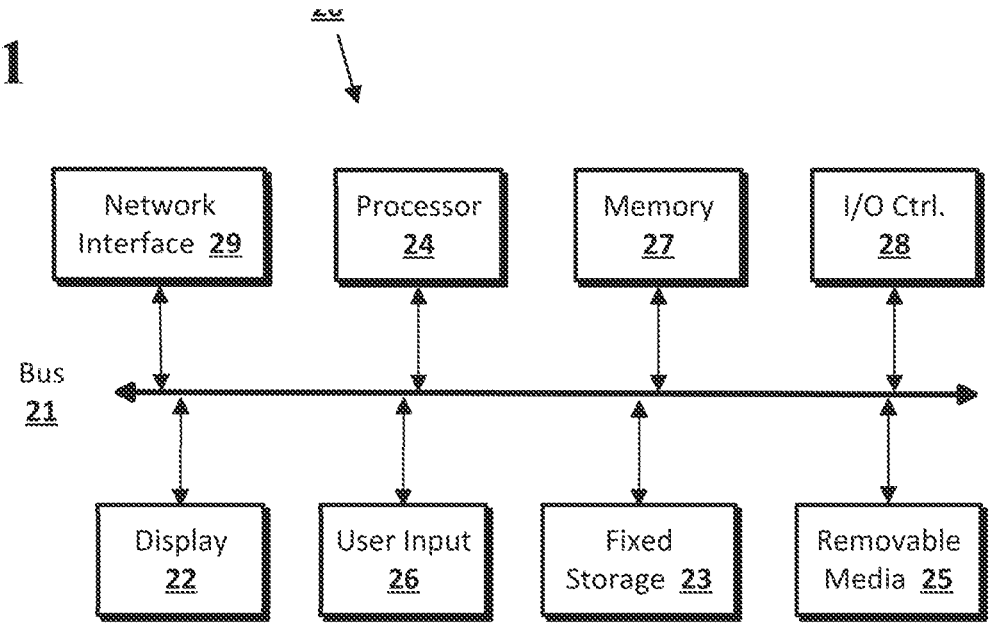
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
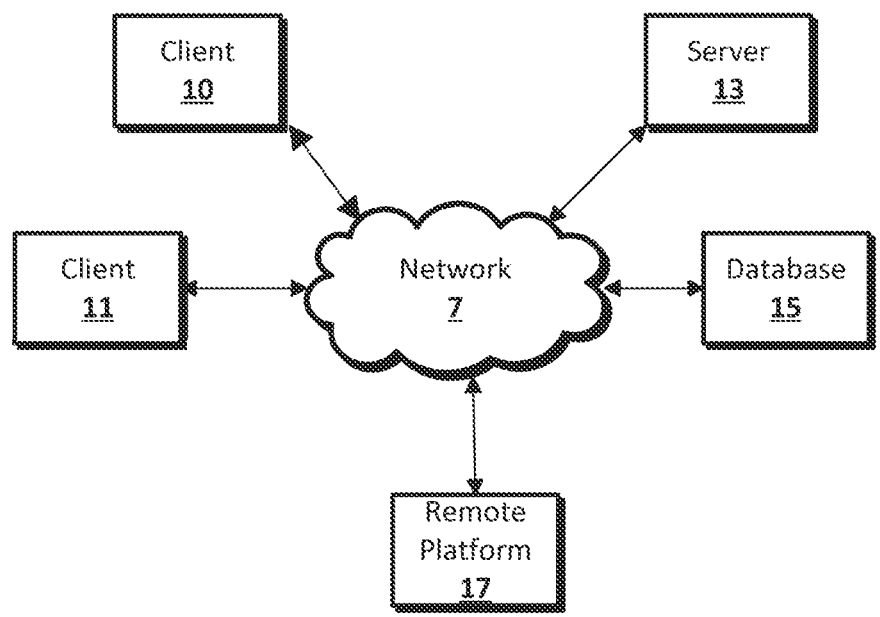
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Data may be received from or provided to an appliance. For example, the appliance may directly receive information regarding a user's schedule so that it may coordinate its function(s) with the user's schedule. Alternatively, the appliance may receive direction as to how it should progress through one or more cycles while a separate device coordinates the appliance with the user's schedule. Data received from the appliance may be utilized to estimate a completion time for a cycle. Data about the appliance may include, for example, the manufacturer, model, year, history of the appliance, and resource consumption. Data about the appliance may also be crowd-sourced. For example, other users' performance data for the same appliance may be utilized to provide an improved estimation of appliance performance, including a cycle completion time. The crowd sourced data may be used to determine how an appliance performs over time. Other information that may be utilized includes the time of day, price of a resource, date information, geographic location, data about other appliances, and data from other appliances. Data may also be obtained from one or more sensors, including those associated with the appliance.

Figure 3:
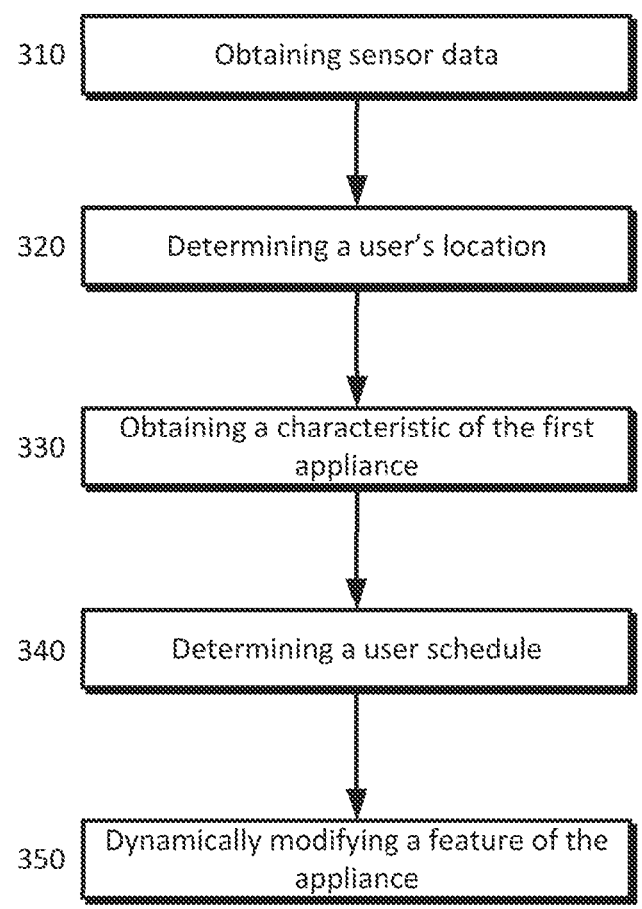
FIG. 3 shows an example process flow for personalizing performance of one or more appliances to the schedule of a user according to an implementation of the disclosed subject matter.

FIG. 3 shows an example process flow for synchronizing an appliance to a user's schedule. An appliance may provide data from a variety of sensors to an external device (such as a server or computer). It may receive data regarding a user's schedule and utilize that information to adjust a cycle. It may also receive data from other appliances and provide data to other appliances so that it may coordinate its function with other appliances. In an implementation, sensor data may be obtained from a sensor at 310. The sensor data may indicate a state of a first appliance, such as current settings of the appliance, a current phase of a cycle the appliance is running, or the like. A sensor may be any device that measures a property of the appliance. For example, a sensor may be a hygrometer, a barometer, a thermometer, an accelerometer, an amp meter, a volt meter, a water meter, an air flow sensor, an air purity sensor or other gas composition analysis tool (e.g., a sensor that measures $CO_2$, $O_2$, or CO), a water purity sensor (e.g., a sensor that determines PPM of a particle or particulate or resistance), a timer, a volume sensor, a tachometer, a speedometer, a fuel consumption meter, a watt meter, a clock, and a phase meter. An analysis tool, such as high performance liquid chromatography ("HPLC") or X-ray diffraction may be a sensor according to implementations disclosed herein. A sensor may be physically associated with the appliance or it may be external to the appliance. For example, many appliance manufacturers place a variety of sensors in their appliances. In some configurations, sensor data are provided to the appliance by a separate device or the appliance acquires sensor data over a network. The sensor data may be transmitted to a device or location that is external to the appliance such as another appliance, to the appliance itself, or a computing device. Sensor data may be transmitted using a network or via other conventional methods of communication.

An appliance or a resource (e.g., gas, water, power) into which the appliance connects may be retrofitted with one or more sensors. For example, a voltage and watt meter connected to a transceiver may be integrated into a wall outlet into which the appliance is connected. When the appliance is activated, the sensor may detect power fluctuations and may infer, based on the pattern of power usage, that the appliance is active. In some cases, the sensor may generate a map or pattern of power fluctuations and delineate a cycle based on a pattern of power consumption. As another example, a hygrometer may be integrated into the exhaust pipe for a dryer. The hygrometer may determine when a load of clothes in the dryer is sufficiently dry and provide the data to one or more appliances or to a remote device such as the central device described in detail below. In another example, one or more gas meters may be disposed between the gas connection to a residence and a gas stove, a gas furnace, a gas dryer, or a gas water heater. A water pressure gauge and flow meter may be used to determine a pattern of water consumption and rate thereof for a variety of appliances as well as household fixtures such as a shower, bath, sink, or a toilet. Water consumption by a sprinkler or sprinkler system may also be monitored using a similar technique.

A sensor may also receive data provided by the user. For example, a user may notify a power sensor in an outlet to which a washer is connected that a washer cycle is about to begin. The user may provide general information to the sensor, such as the size of the load, temperature of the wash selected, or wash cycle setting to allow the sensor to associate the pattern of power consumption with a particular cycle. The input the user provides may also be associated with more than one sensor. For example, a water meter and a gas meter may also be informed that the washer is about to begin a cycle with the user-identified settings. Alternatively or in addition, data provided by the user and/or data provided by the appliance or a sensor associated with the appliance may be received by a central system, such as a home networking system, from the user and/or the appliance. This data may be used to schedule operation of the appliance, as described in further detail herein.

Returning to FIG. 3, a user's location may be determined at 320, for example, by a GPS device, smart phone or other mobile computing device, or the like. For example, the coordinates of a GPS transceiver be used as an assumed location of the user. As another example, a user's location may be determined based on a triangulation of cellular radio towers to which the user's phone has connected, or it may be estimated based on a user's routine. For example, a user may have a fairly consistent arrival time to her workplace and return to her house that may allow a reasonably accurate estimation of the user's location and estimated arrival time at either location.

A characteristic of the first appliance may be obtained at 330. The characteristic may be, for example, a model year, a power consumption, a wiring schematic, a water consumption, a gas consumption, a model number, a manufacturer, a history of the performance of the appliance, and a history of the performance of other appliances that match the appliance. Characteristics as disclosed herein may include crowd-sourced information such as the collective performance of an appliance over time, collective power usage of an appliance, or collective water usage of an appliance. For example, a number of users may own and operate the same appliance. Information may be collected from each of the users and it may be used to generate a profile for an appliance, which then may be updated or maintained over the lifetime of an appliance. For example, if a dishwasher has a tendency to require more time to complete a cycle after it is five years old, the profile may provide such a characteristic to a given user's appliance to improve the estimation of a completion time for a dishwashing cycle. Deviations from the profile may be used to alert the user that an appliance may be in need of repair. In some instances, a malfunctioning part or component may be identified based on the information. One or more appliances may provide data on a characteristic, for example, by directly communicating the data to a cloud-based server over a network or by sending the information to a device that is connected to a database that maintains the characteristics data.

Based upon a user location and the sensor data, a schedule indicating when the user will desire a state change of the first appliance may be determined at 340. A state change may refer to the next interaction between a user and an appliance, completion of a cycle, or completion of a phase of a cycle. A schedule may be determined, for example, by estimating a time for the user to return to a location at which the appliance is located. A schedule may be determined by a user's calendar. For example, many users maintain an online schedule for office or personal appointments. The schedule may indicate, for example, that a user may not return home for at least one hour due to an appointment at the user's workplace and the travel time to commute from the user's office to the house. A schedule may be determined by utilizing a GPS transceiver embedded in a device the user carries such as a smartphone. The GPS transceiver may send coordinates of the device in real time. The provided coordinates may be used to approximate the user's location and determine a schedule of the user such as the user's expected time of arrival back to her home.

The sensor data, crowd-sourced data, characteristics of an appliance, and/or the user's schedule may be used to dynamically modify a feature of the appliance at 350. A feature may refer to, for example, an end time, a start time, a cycle start time, a cycle end time, a power consumption, a fan speed, a spin speed, a temperature, a pressure, an acceleration, a velocity, a gas consumption, a gas flow rate, and a water flow rate. Typically, an appliance has a cycle to complete an action. For example, a dishwasher may progress through the following phases: rinse, detergent/wash, second rinse, and drying. A washer may progress through the following phases: rinse, detergent/wash, second rinse, and spin to remove excess water. Thus, an appliance may progress through a series of steps or phases to complete an action, such as wash dishes or wash clothes.

As an appliance progresses through a series of phases, various features, such as temperature or spin speed, can be modified or, in some cases, programmed by a user. According to an implementation, a feature of a first appliance may be dynamically modified at 350. For example, a user may begin to wash a load of clothes and then take a walk in a nearby park. The washer may estimate the time for completion of the cycle based upon crowd-sourced data for similar washers of a similar age running the same cycle with the same sized load of clothes. Data may be provided to the washer, one or more other appliances, or a computing device at the start of every cycle or updated in real time. Information about the user's location may also be provided and used to determine that, based on the user's location, the user will not return to the house in time to interact with the washer if it completes the cycle according to the manufacturer's settings. As previously described, the data may be provided to a central device such as a home automation system, which then performs the determination of which feature(s) of an appliance may be modified to align the appliance's behavior to a user's schedule.

Continuing the previous example, the washer may be instructed to slow down progression through the cycle or to conduct additional wash, rinse, or tumbling phases of the cycle, for example, to lengthen the cycle completion time according to the schedule of the user. For example, the schedule of the user may be used to determine an expected arrival time of the user and adjust an action of an appliance to finish the action at that time or thereabout. Because the washer is asked to perform an additional action, more resources, such as energy, gas or water, may be utilized. A feature of an appliance may be modified according to implementations disclosed herein and that modification may also result in the appliance operating in an energy efficient manner. Thus, an appliance may be synchronized to the schedule of a user even if it is to the detriment of an energy consideration.

Implementations disclosed herein are adaptive. For example, if a user spontaneously decides after an appointment to deviate from a scheduled appointment, for example, by walking to a store, thereby delaying the user's arrival at her house, the washer may be instructed to adjust a cycle based on the newly determined arrival time. A priori the washer may not predict or know that the destination of the user is the store. However, as the user's location is constantly or intermittently transmitted, a new estimated arrival time (e.g., the time at which the user may next interact with the appliance) for the user may be estimated in real time.

A feature may be dynamically modified in response to usage of a household fixture. For example, a water temperature sensor and flow rate sensor connected to the hot and cold plumbing lines for a shower may detect the temperature and water pressure for the shower respectively. Similar sensors may be connected to the plumbing for the dishwasher. According to an implementation, the start of the dishwashing cycle may be delayed if the shower is in use. A dishwashing cycle may be slowed down until use of the shower is no longer detected. For example, the dishwasher's rinse cycle may be extended or the dishwasher may be instructed to delay proceeding to a subsequent phase of the cycle.

In some implementations, sensor data or other information about the first appliance, such as its estimated time until completion, may be used to modify a cycle or feature of a second appliance. The second appliance may be synchronized to the first appliance. For example, if the dryer has been instructed to delay its completion time for an hour, a washer may be instructed that the dryer will require an additional hour and the cycle of the washer may be modified accordingly. A feature of the second appliance may, therefore, be dynamically modified in response to the sensor data or other information received regarding the first appliance to synchronize the second appliance to the first appliance. Appliances may also be synchronized independently. For example, the washer and dryer may both be instructed to delay completion of their respective cycles for an hour. In some cases, the determination and instruction regarding delay of the cycles may be made by a central system, such as a home automation system or the like.

A notice may be sent to the user to update the user regarding the status of one or more appliances or to provide the user with an option to modify the status of one or more appliances. The notice may contain status information such as an expected finish time, an expected start time, a cycle status (e.g., rinse phase), or a cycle position (e.g., display the phases of a cycle complete and those left to complete). Similarly, a user may request the status of one or appliances or modify a feature thereof using an application, a web browser, or other communication mechanism. For example, a user may make a status request to a dryer which may provide a notice indicating whether or not it has completed its cycle. The user may, for example, use an application to instruct the dryer to delay the timing of its completion for an hour or any other time increment. The dryer may respond to the request to delay completion of a cycle with a subsequent notice to the user. A user may also remotely start a cycle of an appliance. For example, the user may instruct a dishwasher to begin a cycle to wash dishes loaded therein.

Data may be processed and distributed according to any of the implementations disclosed herein by a central device, such as a home automation system, a cloud-based management system, or the like. The device may receive data in real time regarding one or more appliances. The central device may also receive and/or request data from external sensors, other computing devices such as a website indicating the price of water, gas, or weather patterns, or user input data. It may provide data or updated information to one or more appliances based on the information it receives.

In an implementation, a system is provided that includes a central controller. The controller may be configured to obtain sensor data from a sensor that indicates a state of an appliance as previously disclosed. The central controller may be physically connected to the first appliance or connected to the first appliance by a network. A user's location may be determined, for example, based on an electronically provided schedule, GPS coordinates of a device the user carries, triangulation data, or the like. The controller may be configured to obtain characteristics of one or more appliances. Based upon the user location and the sensor data, the central controller may determine a schedule indicating when the user will desire a state change of the first appliance, at which point a feature of the first appliance may be dynamically modified to cause the first appliance to operate according to the schedule. The controller may also be configured to send a notice to the user. The notice may include, for example, status information about the first appliance.

Figure 4:
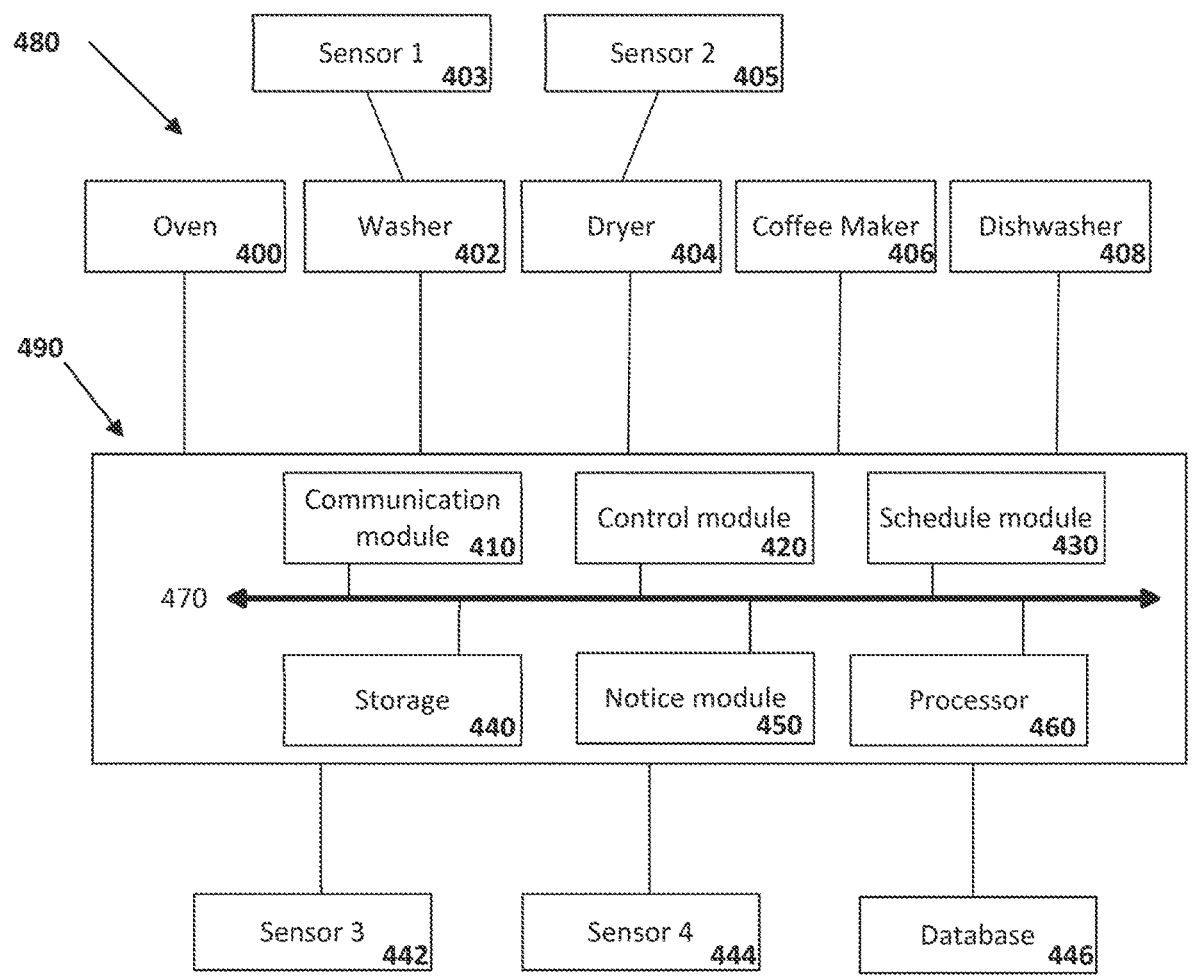
FIG. 4 shows an example of a central device according to implementations disclosed herein.

An example of a central device 490 connected to multiple appliances 480, sensors 442, 444, and a remote database 446 is shown in FIG. 4. The central device 490 may be responsible for coordinating the activities of the various appliances shown or in use 480 with the user's schedule. The central device may be stand-alone device that a user configures and has access to in the household. As shown in FIG. 4, the oven 400, washer 402, dryer 404, coffee maker 406, and dishwasher 408 may be connected to the central device 490 by a variety of mechanisms including, but not limited to a network cable, a wireless protocol such as Bluetooth, or by power lines. For example, data may be communicated along copper wires that carry current for standard power outlets. The communication module 410 may receive incoming data or transmit data. The central device 490 contains a variety of modules 410, 420, 430, 450, storage 440, and a processor 460 that are interconnected by a system bus 470. The modules 410, 420, 430, 450, may exist either as hardware or software according to any of the implementations disclosed herein.

The communication module 410 may receive data from one or more of the appliances 480 connected to the central device 490. The data may include characteristic data such as the make, model, year, and/or manufacturer of the one or more appliances 480. Generally, when a user first plugs in a new appliance or connects the appliance to the central device 490, characteristic data may be sent to the central device 490. The data may be used to generate a profile of for the appliance 480. A profile may be stored in the storage component 340 of the central device 490 or in a remote database 446.

Sensor data may be provided to the central device 490 or to a remote database 446. As shown in FIG. 4, the data may be sent to the central device 490. However, the data may be sent to a central device 490 and/or processed by a remote database or service 446. The remote database 446 or service may send the data to the central device. In some instances, one or more sensors may be internal to an appliance 480. The washer 402 and dryer 404 each have an external sensor 403, 405 that is connected to them. For example, the washer 402 may be plugged into a wall outlet that has a watt/volt meter attached to it. The sensor data from the watt/volt meter may be provided to the washer, for example, and sent by the washer to the central device, or it may be provided directly to the central device by the meter. Other sensors 442, 444 may be unrelated or unconnected to a specific appliance 480 and may send sensor data to the central device 490 or a remote database 446 in communication with the central device 490. For example, a sensor 442, 444 may determine the outside temperature, electrical load for a residence, water pressure, volume of water in a hot water tank, ambient room temperature, humidity, GPS location of user's device, etc. Sensor data, whether provided by an appliance 480, an external sensor 442, 444, or a remote database 446 or relayed by an appliance 480, may be stored to the storage component 440 of the central device 490.

The processor 460 may determine a user's schedule by communicating, for example, with the user's online calendar, a GPS transceiver of a mobile device (e.g., smartphone or a laptop), or the like. The user may permit GPS coordinates of the mobile device to be sent to the central device. GPS coordinates may be maintained in the schedule module 430 and used to determine the user's schedule. For example, the distance between the user's location based on the GPS coordinates and the user's home location may be determined by the central device 490. The user's home location may be manually input into the central device or it may be based on determining the location where the user's GPS-enabled device spends the most time. The user's distance from this "home" location may then be used to determine or estimate a time or window during which the user is expected to return to the home location. The user's determined schedule may be maintained in the storage component 440 or in a remote database 446. For example, a user may link a mobile device to the central device.

The schedule module 430 may maintain information on the status of each appliance 480 connected to the central device 490 or providing such information to a remote database 446 that is in communication with the central device 490. For example, the schedule module 430 may determine that the phase of a cycle that the washer 402, dryer 404, or dishwasher 408 is in. It may determine whether or not the oven 400 is on and, if so, for how long and at what temperature. The schedule module 430 may also determine whether or not other household fixtures, such as a shower, a water heater, a furnace, are in use. Similarly, the schedule module 430 may determine if any timers have been set for any of the appliances 480. As stated earlier, although energy efficiency may be considered in determining the modification of a feature of an appliance, the user's schedule may be paramount even if it is detrimental to the energy efficiency (e.g., power consumption) of one or more appliances 480.

In the event that a timer for an appliance 480 has been set or that a cycle is about to start or end the scheduling module 430 may transmit such information to the notice module 450. The notice module 450 may then generate a notice based on the information received. For example, if the dryer 404 is about to finish drying a load of clothes, a notice may be generated that states, "Dryer finished." The generated notice may be sent to the control module 420. A user may also be provided with an interface to control or monitor the status of one or more appliances 480 connected to the central device 490. The interface may be web or application based, for example. The application may be provided with information about the appliances 480 by the control module 420. It may allow the user to have control over various functions of one or more appliances 480 or configure the central device 490 remotely. For example, a user may desire to begin preheating an oven twenty minutes before the user's arrival home. The user may set a specific time to begin the preheating the oven 400 or the user may configure the central device 490 to preheat the oven 400 when the user is twenty minutes from home as determined by a GPS transceiver in her mobile phone.

The control module 420 may coordinate data received and transmitted via the communications module 410 as well as the schedule module 430. For example, the control module 430 may route data received from a remote database 446 to the appropriate module. It may communicate information between modules. For example, once a notice has been sent to the user regarding the status of an appliance 480, the control module 420 may inform the notice module 450 of the action taken. The control module 420 may also receive user preferences. For example, the user may indicate that the user would like a status update on every active appliance 480 every hour. Preferences may be provided to the central device 490 by, for example, a web page entry or by entering a preference into an appliance 480.

Implementations disclosed herein refer to a single user, however, they are not so limited. The central device, for example, may determine, update, and store the schedules of multiple users and each user may have a set of individual preferences. For example, a first user may not be associated with the washer and dryer appliances. That user may, therefore, not receive updates as to the status of the appliance sent by the central device unless the user queries the system for such information. The central device may also ignore that user's schedule for the purpose of synchronizing the user's schedule with the washer and dryer. The user, however, may be associated with other appliances in the household and receive updates regarding those appliances, and the system may consider the user's schedule in adjusting a cycle of one or more of those appliances.

In situations in which the systems or central device discussed here collect personal information about users, or may make use of personal information, the users may be provided with an opportunity to control whether programs or features collect user information (e.g., information about a user's social network, social actions or activities, profession, a user's preferences, schedule, location, calendar, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a central device or system according to any of the implementations disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   receiving, by a processing system and from a user device, an information indicative of a location of a user, wherein the location of the user is outside of a premises of the user;
   causing, by the processing system and in response to receiving the information, an operation of a first appliance located within the premises of the user; and
   modifying, by the processing system and in response to receiving the information, a second operation of a second appliance, wherein the modifying the second operation comprises modifying a preprogrammed cycle or feature of the second appliance.

2. The method of claim 1, wherein the causing the operation of the first appliance comprises lengthening a completion time of the operation to coincide with a return time of the user to the premises.

3. The method of claim 1, wherein the causing the operation of the first appliance comprises slowing down progression through an operating phase of the operation of the first appliance.

4. The method of claim 1, wherein the causing the operation of the first appliance comprises adding at least one additional operating phase to the operation of the first appliance.

5. The method of claim 4, wherein the at least one additional operating phase causes the first appliance to consume at least one of energy, gas, or water.

6. A method comprising:
   receiving, by a processing system and from a user device, an information indicative of a location of a user, wherein the location of the user is outside of a premises of the user;
   estimating, by the processing system and in response to receiving the information indicative of the location of the user, a time of return of the user to the premises;
   causing, by the processing system and in response to the estimated time of return of the user to the premises, an operation of a first appliance located within the premises of the user; and
   modifying, by the processing system and in response to the estimated time of return of the user to the premises, a second operation of a second appliance, wherein the modifying the second operation of the second appliance is based on modifying an operation of the first appliance based on the estimated time of return of the user to the premises.

7. The method of claim 6, wherein the causing the operation of the first appliance comprises one of lengthening or shortening a completion time of the operation to coincide with the estimated time of return of the user to the premises.

8. The method of claim 6, wherein the causing the operation of the first appliance comprises one of slowing down or speeding up a progression of an operating phase of the operation of the first appliance.

9. The method of claim 6, wherein the causing the operation of the first appliance comprises one of adding or removing at least one additional operating phase to the operation of the first appliance.

10. A system comprising:
    a central controller comprising a processing system and computer readable storage, the processing system configured to:
    receive, from a user device, an information indicative of a location of a user, wherein the location of the user is outside of a premises of the user;
    cause, in response to receiving the information, an operation of a first appliance located within the premises of the user; and
    modify, in response to receiving the information, a second operation of a second appliance, wherein the modifying the second operation of the second appliance is based on modifying the operation of the first appliance.

11. The system of claim 10, wherein the modifying the second operation comprises modifying a preprogrammed cycle or feature of the second appliance.

12. The system of claim 10, wherein the modifying the second operation of the second appliance is based on the modifying the operation of the first appliance based on an estimated time of return of the user to the premises.

13. The system of claim 10, wherein the modifying the second operation comprises delaying a completion time of the second appliance.

14. The system of claim 10, wherein the modifying the second operation synchronizes a timing operation between the first appliance and the second appliance.

15. The system of claim 10, wherein the modifying the second operation adds a period of time to the second operation equal to another period of time added to the operation of the first appliance.

16. A method comprising:
receiving, by a processing system and from a user device, an information indicative of a location of a user, wherein the location of the user is outside of a premises of the user;
causing, by the processing system and in response to receiving the information, an operation of a first appliance located within the premises of the user; and
modifying, by the processing system and in response to receiving the information, a second operation of a second appliance, wherein the modifying the second operation comprises delaying a completion time of the second appliance.

17. The method of claim 16, wherein the causing the operation of the first appliance comprises lengthening a completion time of the operation to coincide with a return time of the user to the premises.

18. The method of claim 16, wherein the causing the operation of the first appliance comprises slowing down progression through an operating phase of the operation of the first appliance.

19. A method comprising:
receiving, by a processing system and from a user device, an information indicative of a location of a user, wherein the location of the user is outside of a premises of the user;
causing, by the processing system and in response to receiving the information, an operation of a first appliance located within the premises of the user; and
modifying, by the processing system and in response to receiving the information, a second operation of a second appliance, wherein the modifying the second operation synchronizes a timing operation between the first appliance and the second appliance.

20. The method of claim 19, wherein the causing the operation of the first appliance comprises adding at least one additional operating phase to the operation of the first appliance.

21. The method of claim 20, wherein the at least one additional operating phase causes the first appliance to consume at least one of energy, gas, or water.

22. A method comprising:
receiving, by a processing system and from a user device, an information indicative of a location of a user, wherein the location of the user is outside of a premises of the user;
causing, by the processing system and in response to receiving the information, an operation of a first appliance located within the premises of the user; and
modifying, by the processing system and in response to receiving the information, a second operation of a second appliance, wherein the modifying the second operation adds a period of time to the second operation equal to another period of time added to the operation of the first appliance.

23. The method of claim 22, wherein the causing the operation of the first appliance comprises lengthening a completion time of the operation to coincide with an estimated time of return of the user to the premises.

24. The method of claim 22, wherein the causing the operation of the first appliance comprises slowing down a progression of an operating phase of the operation of the first appliance.

25. A method comprising:
receiving, by a processing system and from a user device, an information indicative of a location of a user, wherein the location of the user is outside of a premises of the user;
causing, by the processing system and in response to receiving the information, an operation of a first appliance located within the premises of the user; and
modifying, by the processing system and in response to receiving the information, a second operation of a second appliance, wherein the modifying the second operation is based on modifying the operation of the first appliance.

26. The method of claim 25, wherein the causing the operation of the first appliance comprises one of slowing down or speeding up a progression of an operating phase of the operation of the first appliance.

27. The method of claim 25, wherein the causing the operation of the first appliance comprises one of adding or removing at least one additional operating phase to the operation of the first appliance.

\* \* \* \* \*